United States Patent [19]
Bierlein et al.

[11] Patent Number: 5,157,754
[45] Date of Patent: Oct. 20, 1992

[54] WAVELENGTH CONVERSION BY QUASI PHASE MATCHING AND THE MANUFACTURE AND USE OF OPTICAL ARTICLES THEREFOR

[75] Inventors: John D. Bierlein, Wilmington; Joseph B. Brown, III, Newark, both of Del.; Carolus J. van der Poel, Eindhoven, Netherlands

[73] Assignee: E.I. Du Pont de Nemours, Wilmington, Del.

[21] Appl. No.: 732,028

[22] Filed: Jul. 18, 1991

Related U.S. Application Data

[63] Continuation of Ser. No. 514,787, Apr. 25, 1990, abandoned, and Ser. No. 514,822, Apr. 26, 1990, abandoned, said Ser. No. 514,822, is a continuation-in-part of Ser. No. 514,787.

[51] Int. Cl.$^5$ ............................................. G02F 1/35
[52] U.S. Cl. .................................. 385/122; 359/332; 385/129; 385/141
[58] Field of Search ........................ 359/326–332; 385/122, 129, 130, 131, 141, 142

[56] References Cited

U.S. PATENT DOCUMENTS

| | | | |
|---|---|---|---|
| 3,688,124 | 8/1972 | Freund et al. | 359/330 |
| 3,949,323 | 4/1976 | Bierlein et al. | 332/7.51 |
| 4,221,981 | 9/1980 | Deserno | 359/326 |
| 4,231,838 | 11/1980 | Gier | 156/600 |
| 4,305,778 | 12/1981 | Gier | 156/623 R |
| 4,331,891 | 5/1982 | Rizzo | 359/329 |
| 4,346,314 | 8/1982 | Craxton | 359/329 |
| 4,740,265 | 4/1988 | Bierlein et al. | 156/624 |
| 4,766,954 | 8/1988 | Bierlein et al. | 156/624 |
| 4,884,276 | 11/1989 | Dixon et al. | 35/326 X |
| 4,896,931 | 1/1990 | Khurgin | 385/129 |
| 5,002,360 | 3/1991 | Colak et al. | 385/122 |
| 5,028,107 | 7/1991 | Bierlein et al. | 359/328 |
| 5,036,220 | 7/1991 | Byer et al. | 307/427 |
| 5,046,803 | 9/1991 | Colak | 385/122 |
| 5,048,905 | 9/1991 | Fejer et al. | 350/96.12 |

OTHER PUBLICATIONS

Adams, M. J., "An Introduction to Optical Waveguides" (1981), pp. 201–206.

Armstrong et al., "Interactions Between Light Waves In A Nonlinear Dielectric", *Physical Review*, vol. 127, No. 6, Sep. 15, 1962, pp. 1918–1939.

(List continued on next page.)

*Primary Examiner*—John D. Lee
*Attorney, Agent, or Firm*—Sughrue, Mion, Zinn Macpeak & Seas

[57] ABSTRACT

Articles and process for wavelength conversion are disclosed which use a series of aligned sections of optical materials for wavelength conversion selected from materials having the formula $K_{1-x}Rb_xTiOMO_4$ where x is from 0 to 1 and M is selected from P and As and materials of said formula wherein the cations of said formula have been partially replaced by at least one of $Rb^+$, $Tl^+$ and $Cs^+$, and at least one of $Ba^{++}$, $Sr^{++}$ and $Ca^{++}$. The series of sections is characterized with regard to a change in nonlinear optical coefficient, section length, and section $\Delta k$ (i.e., the difference between the sum of the propagation constants for the incident waves and the sum of the propagation constants for the waves generated). The sections are selected such that the sum for the series of the product of the length of each section with the $\Delta k$ is equal to about $2\pi N$ (where N is an integer other than zero) and the nonlinear optical coefficient for at least one section is changed relative to the nonlinear optical coefficient for at least one adjacent section. Also disclosed is a process for preparing a channel waveguide for wavelength conversion systems wherein areas along a portion of a crystal substrate surface used for forming the desired channel are alternately masked and unmasked during cation replacement by immersion in a molten salt.

19 Claims, 3 Drawing Sheets

OTHER PUBLICATIONS

Bierlein et al., "Potassium Titanyl Phosphate: Properties And New Applications", *J. Opt. Soc. Am. B*, vol. 6, No. 4, Apr. 1989, pp. 622–633.

Hunsperger, R. G., "Integrated Optics: Theory and Technology", pp. 38–43 (1984).

Magel et al., "Quasi-Phase-Matched Second-Harmonic Generation of Blue Light in Periodically Poled LiNbO$_3$", *Appl. Phys. Lett* 56(2), Jan. 8, 1990 (1990 American Institute of Physics), pp. 108–110.

Somekh et al., "Phase-Matchable Nonlinear Optical Interaction in Periodic Thin Films", *Appl. Phys. Lett.*, vol. 21, No. 4, Aug. 15, 1972, pp. 140–141.

Webjörn et al., "Fabrication of Periodically Domain-Inverted Channel Waveguides in Lithium Niobate for Second Harmonic Generation", *Journal of Lightwave Technology*, vol. 7, No. 10, Oct. 1989, pp. 1597–1600.

Webjörn et al., "Blue Light Generated by Frequency Doubling of Laser Diode Light in a Lithium Niobate Channel Waveguide", *IEEE Photonics Technology Letter*, vol. 1, No. 10, Oct. 1989, pp. 316–318.

FIG. 1
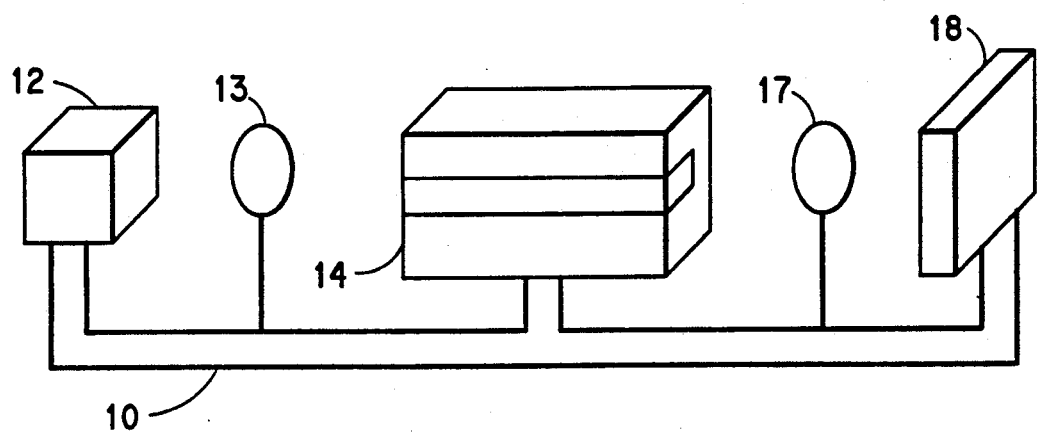
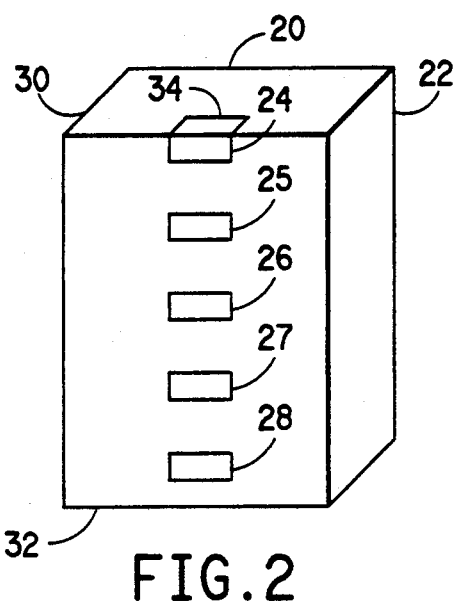
FIG. 2
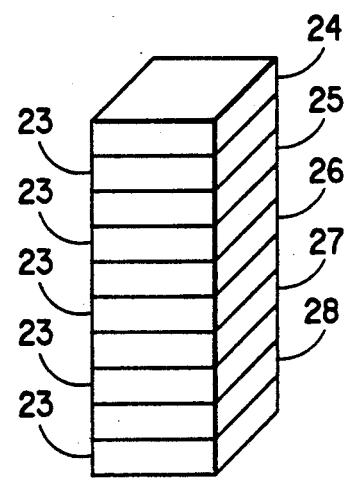
FIG. 3
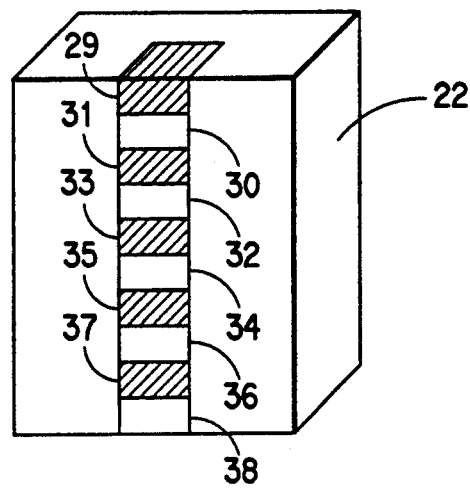
FIG. 4

WAVELENGTH CONVERSION BY QUASI PHASE MATCHING AND THE MANUFACTURE AND USE OF OPTICAL ARTICLES THEREFOR

This application is a combined Continuation Application of U.S. Application Ser. No. 07/514,787 filed Apr. 25, 1990, and entitled "Wavelength Conversion by Quasi Phase Matching and the Manufacture and Use of Optical Articles Therefor," and U.S. Application Ser. No. 07/514,822, filed Apr. 26, 1990, and entitled "Wavelength Conversion by Periodic Structure and the Manufacture and Use of Optical Articles Therefor" (both now abandoned). U.S. Ser. No. 07/514,822 is a Continuation-in-Part Application of U.S. Ser. No. 07/514,787.

FIELD OF THE INVENTION

This invention relates to optical articles and more particularly to optical articles useful for wavelength conversion.

BACKGROUND OF THE INVENTION

The advantages of optical systems for communications, optical storage and other applications has spurred the search for optical mediums with high nonlinearity, good optical quality, and the ability to phase match to increase the frequency of incident laser light. A challenge often encountered in the design of such systems is the efficient generation of optical waves with wavelengths which are particularly suitable for use in such systems. For example, while efficient laser generating of infrared waves is commonly available, the direct generation of certain more desirable waves having shorter wavelengths is often considerably more difficult.

One approach to providing waves with more desirable wavelengths has been wavelength conversion whereby articles containing an optical medium are used to at least partially convert optical waves incident to the medium to exiting optical waves having a different wavelength. A frequently used wavelength conversion process involves second harmonic generation where the frequency of waves generated is doubled with respect to the incident waves. In the typical process incident optical waves are directed through a medium (e.g., an inorganic nonlinear crystal) in which optical waves having wavelengths corresponding to the second harmonic of the wavelength of the incident optical wave are 5 generated by interaction between the medium and the optical waves and exit the medium.

Typically in optical articles for wavelength conversion, waves of suitable wavelength are generated over the length of the medium. It is well known in designing such articles that unless means are provided for inhibiting destructive interference between the waves generated at various points along the medium length, the efficiency of wavelength conversion schemes such as second harmonic generation can be severely limited. Accordingly, there is generally a need to employ some technique to control the effects of such destructive interference.

In somewhat more theoretical terms, wavelength conversion systems may be generally addressed in terms of a propagation constant k for each of the interacting optical waves in the conversion medium. For the purposes of this description, k for each optical wave may be defined as equal to $2\pi n/\lambda$, where n is the refractive index of the medium and $\lambda$ is the wavelength of the wave. In view of the inverse relationship between the propagation constant and the wavelength, and the fact that the refractive index can be different for optical waves of different frequencies, the propagation constant for each of the interacting optical waves in the conversion medium can clearly be different.

Generally, for wavelength conversion the sum of frequencies of the interacting incident waves is equal to the sum of the frequencies of the waves generated by the interaction. To minimize the destructive interference between waves generated in the medium, it has generally been considered desirable that the sum of the propagation constants of the interacting incident waves also closely approximate the sum of the propagation constants of the waves generated by the interaction. In other words, for the optical waves involved in the wavelength conversion, it has been considered desirable for efficient wavelength conversion that the difference between the total propagation constants for the incident waves in the medium and the total propagation constants for the waves generated in the medium (i.e., the $\Delta k$ for the medium) be about zero. Adjusting a wavelength conversion system to a condition where $\Delta k$ is about zero is known as phase matching.

An optical parameter of some interest in wavelength conversion systems for a particular medium is the coherence length, coh, which is generally defined as $2\pi/\Delta k$. For conditions where $\Delta k$ is equal to about zero, it is evident that the corresponding coh is relatively large.

In a normal phase matching process involving the nonlinear interaction of three beams in a crystal system where two beams of incident optical waves having respective frequencies $\omega_1$, and $\omega_2$ and respective wavelengths $\lambda_1$ and $\lambda_2$ are directed through a medium (e.g., a crystal or a composite material) having a refractive index $n(\omega)$ which varies as a function of the optical wave frequency, to generate optical waves having a frequency $\omega_3$ and a wavelength $\lambda_3$, a beam propagation constant k is defined for each wave beam as equal to $2\pi n(\omega)/\lambda$ and a $\Delta k$ for the optical medium is represented by the relationship:

$$\Delta k = \frac{2\pi n(\omega_3)}{\lambda_3} - \frac{2\pi n(\omega_2)}{\lambda_2} - \frac{2\pi n(\omega_1)}{\lambda_1}.$$

The maximum output intensity occurs in such a system when under conditions where the phase system is matched (i.e., $\Delta k$ is zero). The intensity of output for a phase matched system generally increases in proportion to $h^2$, the square of the length, h, of the optical medium (e.g., the crystal).

For second harmonic generation systems the frequencies $\omega_1$ and $\omega_2$ are taken as equal and as one half of the frequency $\omega_3$. Accordingly, the wavelengths $\lambda_1$ and $\lambda_2$ are twice the wavelength $\lambda_3$ and $\Delta k$ for second harmonic generation systems may be represented in terms of the above example, by the relationship:

$$\Delta k = \frac{2\pi}{\lambda_3}(n(\omega_3) - n(\omega_1)).$$

The coherence length for such second harmonic generation systems may thus be represented by the relationship:

$$coh = \frac{\lambda_3}{n(\omega_3) - n(\omega_1)} = \frac{0.5\lambda_1}{n(\omega_3) - n(\omega_1)}.$$

An alternate example of a wave conversion scheme involves generating two waves with wavelengths $\lambda_5$ and $\lambda_6$ from a single input wave of wavelengths $\lambda_4$.

Several techniques have been demonstrated or proposed for achieving efficient phase matching. (See, for example, F. A. Hoof et al., Applied Classical Electrodynamics, Volume II, Nonlinear Optics, John Wiley & Sons, 1986, pp. 29-56.) The most common of these are the angle and temperature tuning techniques used in nearly all current applications such as second harmonic generation and sum and difference frequency generation. In angle tuning of bulk material such as a single crystal, the orientation of the crystal relative to the incident light is adjusted to achieve phase matching. The technique is generally considered inappropriate for use in waveguide structures which, by nature of their design, must be oriented in a particular direction relative to the incident waves. Temperature tuning relies on the temperature dependence of the birefringence of the material and may be used for waveguides as well as bulk material. However, for many materials the temperature dependence of the birefringence is large and, although temperature tuning is possible for waveguides in these materials, a high degree of temperature control must be provided (e.g., $+/-1°$ C.). In optical materials where the temperature dependence of the birefringence is small (e.g., $KTiOPO_4$), although a high degree of temperature control is not necessary, the range of wavelengths over which temperature tuning is possible for waveguides is small.

Phase matching for second harmonic generation using periodic variations in the refractive index to correct for the fact that $\Delta k$ is not equal to 0, can be accomplished by reflecting back both the fundamental and second harmonic beams in such a way that the reflected beams are phase matched (see, for example, S. Somekh, "Phase-Interchangeable Nonlinear Optical Interactions in Periodic Thin Films," Appl. Phys. Lett., 21, 140 (1972)). As with the methods above, the intensity of the second harmonic output increases with the square of the length of the material used. However, in practice, the overall efficiency of this method is even less than the methods discussed above.

Recently, a particularly useful wavelength conversion technique has been developed by J. Bierlein et al., which involves directing the incident optical waves for wavelength conversion through a series of aligned sections of optical materials for wavelength conversion, said sections being selected such that the sum for the series of sections of the product of the length of each section in the direction of alignment and the $\Delta k$ for that section is equal to about zero, and such that the length of each section is less than its coherence length; wherein either at least one of said materials is optically nonlinear or a layer of nonlinear optical material is provided adjacent to said series during wavelength conversion, or both. This technique is based on the discovery that wavelength conversion can be accomplished by using a series of sections of optical materials wherein the differences in the refractive indices and the section lengths are balanced to control the effects of destructive interference through the series such that the optical waves are phase matched at the end of the series even though they are not phase matched in the individual sections. (See U.S. Pat. No. 5,028,107.)

Other techniques for wavelength conversion, which are known as 'quasi' phase matching techniques, and include periodic domain reversals or internal reflection have also been described (see J. A. Armstrong et al., "Interactions between Light Waves in a Nonlinear Dielectric", Phys. Rev., 127, 1918 (1962)). Quasi phase matching in optical waveguides has been described using periodically modulated $LiNbO_3$ which achieve phase matching by periodically reversing the sign of the nonlinear optical coefficient with a period length such that the product of $\Delta k$ and period length of the waveguide is about equal to $2N\pi$ where N is an odd integer. Periodically domain-inverted channel waveguides utilizing $LiNbO_3$ are described by J. Webjorn, F. Laurell, and G. Arvidsson in Journal of Lightwave Technology, Vol. 7, No. 10, 1597–1600 (October 1989) and IEEE Photonics Technology Letters, Vol. 1, No. 10, 316–318 (October 1989). Waveguide fabrication is described using titanium to achieve the periodic domain inversion, or using a periodic pattern of silicon oxide on the positive c-face of $LiNbO_3$ in combination with heat treatment and subsequent proton exchange. G. A. Magel, M. M. Fejer and R. L. Byer, Appl. Phys. Let. 56, 108–110 (1990) disclose $LiNbO_3$ crystals with periodically alternating ferroelectric domains produced using laser-heated pedestal growth. These structures generated light at wavelengths as short as 407 nm and were relatively resistant to photorefractive damage for structures of this type. However, these periodically modulated waveguides are considered difficult to fabricate and have optical damage thresholds which are too low for many applications. Hoof et al., supra, discloses at page 52 segments of nonlinear optical material where the nonlinear optical coefficient is modulated at a period equal to the coherence length for the waves in the material.

Other modulated waveguide schemes have been described in the art which can give phase matching by using lengths of adjacent materials which are equal to the coherence length. However, these periodically modulated schemes can be very sensitive to waveguide parameters, such as waveguide depth and modulation period, and are not highly efficient with respect to conversion.

There remains a need for wavelength conversion schemes for efficiently converting fundamental optical waves to useful alternate wavelengths.

SUMMARY OF THE INVENTION

This invention makes use of the well known advantages of $KTiOMO_4$-type materials (where M is P or As), such as high nonlinearity and resistance to damage, as well as quasi phase matching, and provides for changing the sign and/or magnitude of the nonlinear optical coefficient (i.e., "d") to achieve wavelength conversion. A series of sections of optical materials is used in accordance with this invention to accomplish wavelength conversion by quasi phase matching. The series of sections is characterized such that the nonlinear optical coefficient for at least one section is changed relative to the nonlinear optical coefficient for at least one adjacent section; and such that the sum for the series of the product of the length (i.e., $h_i$) and $\Delta k$ for each section (i.e., $\Delta k_i$) is equal to about $2N\pi$ $$\left(\text{i.e., } \sum_i \Delta k_i h_i \approx 2\pi N\right)$$

where N is an integer other than zero. A preferred method of changing the nonlinear optical coefficient includes reversing the axis of polarization for at least one section relative to the axis of polarization for at least one adjacent section. Preferably, there is at least about 1% difference between the nonlinear optical coefficient for at least one section and the nonlinear optical coefficient for at least one adjacent section; and preferably there is at least about 0.00025 difference between the surface index of refraction of said at least one section and the surface index of refraction of said at least one adjacent section.

A process for wavelength conversion is provided in accordance with this invention which comprises the step of directing the incident optical waves for wavelength conversion through a single crystal containing a series of aligned sections of optical materials selected from (a) materials having the formula $K_{1-x}Rb_xTiOMO_4$ where x is from 0 to 1 and M is selected from the group consisting of P and As and (b) materials of said formula wherein the cations of said formula are partially replaced by at least one of $Rb^+$, $Tl^+$, $Cs^+$ and at least one of $Ba^{++}$, $Sr^{++}$ and $Ca^{++}$ (with the provisos that at least one section is of optical materials selected from (b) and that for optical materials selected from (b) wherein x is greater than 0.8, the cations of said formula are partially replaced by at least one of $Tl^+$ and $Cs^+$ and at least one of $Ba^{++}$, $Sr^{++}$ and $Ca^{++}$), said sections being selected such that the sum for the series of sections of the product of the length of each section in the direction of alignment (i.e., $h_i$) and the $\Delta k$ for that section (i.e., $\Delta k_i$) is equal to about $2\pi N$ $$\left(\text{i.e., } \sum_i \Delta k_i h_i \approx 2\pi N\right)$$

where N is an integer other than 0, and such that the nonlinear optical coefficient of at least one section is changed relative to the nonlinear optical coefficient of at least one adjacent section. The $\Delta k$ for each section is the difference between the sum of the propagation constants for the incident waves for the wavelength conversion system in that section and the sum of the propagation constant for the generated waves for the wavelength conversion system in that section. The process may be used to generate beams having a certain wavelength from two incident beams. Alternatively, the process may be used to generate two beams from one incident beam. A preferred use of the wavelength conversion process, however, is for second harmonic generation, wherein the generated waves have a wavelength which is one-half the wavelength of the incident beams.

Optical articles are provided in accordance with this invention for use in a wavelength conversion system. The articles comprise at least one optical conversion segment consisting of a single crystal containing a series of aligned sections of optical materials selected from (a) materials having the formula $K_{1-x}Rb_xTiOMO_4$ and (b) materials of said formula wherein the cations of said formula have been partially replaced by at least one of $Rt^+$, $Tl^+$, and $Cs^+$, and at least one of $Ba^{++}$, $Sr^{++}$ and $Ca^{++}$ (with the provisos that at least one section is of optical materials selected from (b) and that for optical materials selected from (b) wherein x is greater than 0.8, the cations of said formula are partially replaced by at least one of $Tl^+$ and $Cs^+$ and at least one of $Ba^{++}$, $Sr^{++}$ and $Ca^{++}$), wherein said sections are selected so that the sum of the product of the length of each section (i.e., $h_i$) and the $\Delta k$ for that section (i.e., $\Delta k_i$) is equal to about $2\pi N$ $$\left(\text{i.e., } \sum_i \Delta k_i h_i \approx 2\pi N\right)$$

where N is an integer other then 0, and the nonlinear optical coefficient of at least one section is changed relative to the nonlinear optical coefficient of at least one adjacent section.

For a segment having p sections of respective lengths $h_1, h_2, \ldots h_i, \ldots h_p$ characterized as having a series of propagation constants $k_1, k_2, \ldots k_i, \ldots k_p$ for each of the optical waves in the wavelength conversion system wherein $k_i = 2\pi n_i(\omega)/\lambda$, and $n_i(\omega)$ and $\lambda$ are respectively the refractive index in the section and wavelength, a $\Delta k$ is provided for each section which corresponds to the difference between the total propagation constants for the incident waves for the wavelength conversion system in the section and the total propagation constants for the generated waves for the wavelength conversion system in the section. In accordance with this invention, the sections for each segment are selected so that the sum $\Delta k_1 h_1 + \Delta k_2 h_2 + \ldots \Delta k_i h_i + \ldots \Delta k_p h_p$ for the segment (i.e., the sum $h_i \Delta k_i$ for the series, or $$\sum_i \Delta k_i h_i)$$

is equal to about $2\pi N$, and the nonlinear optical coefficient of at least one section is changed relative to the nonlinear optical coefficient of at least one adjacent section.

A preferred embodiment involves second harmonic generation.

The invention further provides for improved optical devices which comprise at least one optical article, means to couple an incoming optical wave into said optical article and means to couple an outgoing wave out of said optical article, wherein the improvement comprises using an optical article constructed in accordance with this invention. For example, channel waveguides constructed in accordance with this invention can be used to improve optical waveguide devices which comprise at least one channel waveguide, means to couple an incoming optical wave into said channel waveguide and means to couple an outgoing wave out of said channel waveguide.

This invention further provides a process for preparing an optical article. One process for preparing a channel waveguide having a series of aligned sections wherein the nonlinear optical coefficient of at least one section is changed relative to the nonlinear optical coefficient of at least one adjacent section for a wavelength conversion system in accordance with this invention comprises the steps of: (1) providing the z-surface of a z-cut substrate of single crystal material having the formula $K_{1-x}Rb_xTiOMO_4$ wherein x is from zero to one and M is P or As, with an optically smooth surface;

(2) providing a molten salt containing cations selected from the group consisting of Rb+, Cs+ and Tl+ and cations selected from the group consisting of Ba++, Sr++ and Ca++ (with the proviso that when x is greater than 0.8, the molten salt contains cations selected from Cs+ and Tl+) in an amount effective to provide upon exposure to said optically smooth surface at a selected temperature for a selected time, sufficient cation replacement to change the index of refraction with respect to the index of refraction of said substrate and to provide a nonlinear optical coefficient which is changed with respect to the nonlinear optical coefficient of the substrate; (3) applying a masking material on said substrate to provide a pattern of aligned areas along a portion of said optically smooth z-surface which are alternately masked with a material resistant to said molten salt and unmasked; (4) immersing said masked substrate in said molten salt at said selected temperature for said selected time, thereby providing cation replacement in said unmasked areas; (5) removing the masking material from said substrate; and (6) finishing said substrate to provide a clean waveguide with polished waveguide input and output faces. In this process, the lengths of the masked and unmasked areas are selected such that after cation replacement in the unmasked areas, a waveguide which comprises at least one optical conversion segment consisting of a series of aligned sections of optical materials for wavelength conversion in accordance with this invention is provided. The invention is considered particularly useful for the generation of blue light using modified $KTiOPO_4$ single crystals.

BRIEF DESCRIPTION OF THE DRAWINGS

FIG. 1 is a schematic drawing of an apparatus for wavelength conversion in accordance with this invention.

FIG. 2 is a perspective view of a waveguide for wavelength conversion in accordance with this invention.

FIG. 3 is a perspective view of the aligned sections of nonlinear optical material provided by the waveguide of FIG. 2.

FIG. 4 is a perspective view of another embodiment of a waveguide for wavelength conversion in accordance with this invention.

DETAILED DESCRIPTION OF THE INVENTION

Figure 5:
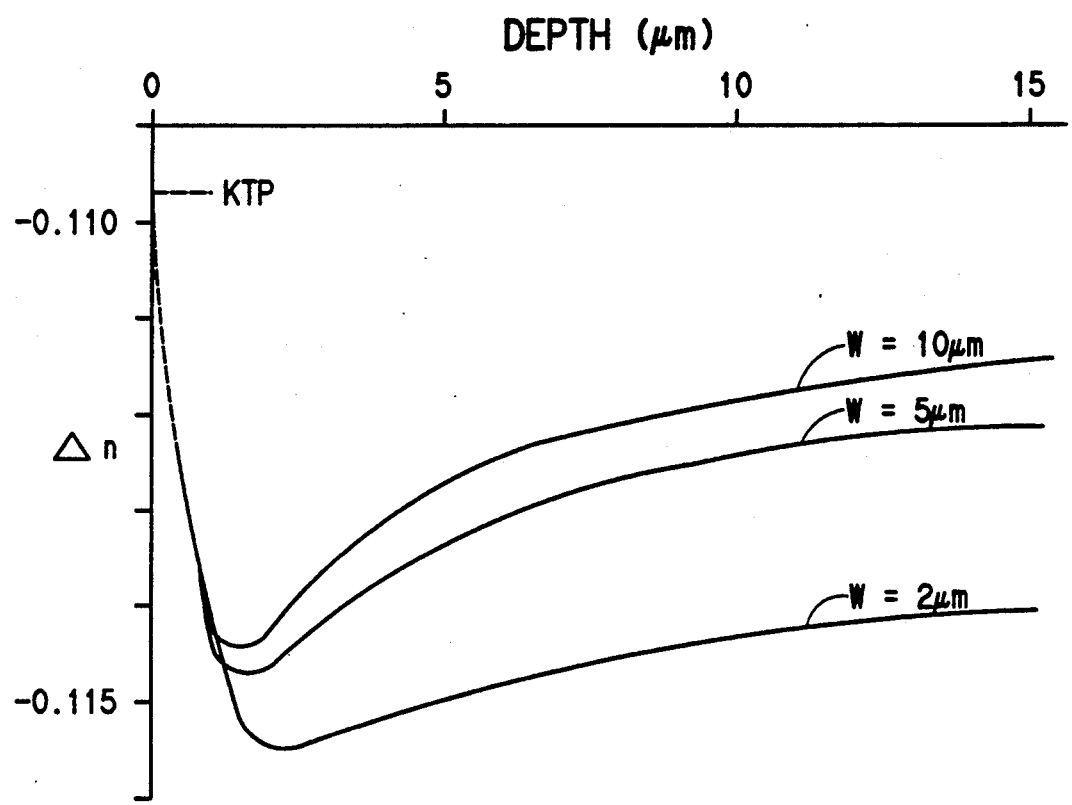
FIG. 5 is an illustrative plot of a calculated relationship between depth and refractive index mismatch for different waveguide-widths.

In accordance with this invention means are provided which are suitable for at least partially converting optical waves having one wavelength, into optical waves of a different wavelength. In general, during wavelength conversion the sum of the frequencies of the incident waves and the sum of the frequencies of the generated waves are equal. Accordingly, for wavelength conversion systems where waves of frequency $\omega_1$ and wavelength $\lambda_1$ are used along with waves of frequency $\omega_2$ and wavelength $\lambda_2$ to generate waves of frequency $\omega_3$ and wavelength $\lambda_3$, $\omega_3$ is equal to the sum of $\omega_1$ and $\omega_2$; and for wavelength conversion systems where waves of frequency $\omega_4$ and wavelength $\lambda_4$ are used to generate waves of frequency $\omega_5$ and wavelength $\pi_5$ along with waves of frequency $\omega_6$ and wavelength $\lambda_6$, $\omega_4$ is equal to the sum of $\omega_5$ and $\omega_6$.

A process for wavelength conversion is provided in accordance with this invention which comprises the step of directing the incident optical waves for wavelength conversion through a single crystal containing a series of aligned sections of optical materials for wavelength conversion, said sections being selected such that the sum for the series of sections of the product of the length of each section in the direction of alignment and the $\Delta k$ for that section is equal to about $2N\pi$ where N is an integer other than zero, and the nonlinear optical coefficient for a least one section is changed relative to the nonlinear optical coefficient of at least one adjacent section. As further discussed below, $\Delta k$ for each section is the difference between the sum of the propagation constants for the incident waves for the wavelength conversion system in that section and the sum of the propagation constants for the generated waves for the wavelength conversion system in that section.

The crystalline optical materials used in this invention are single crystal materials having the formula $K_{1-x}Rb_xTiOMO_4$ where x is from 0 to 1 and M is selected from the group consisting of P and As and single crystal material of said formula wherein the cations of said formula have been partially replaced by at least one of Rb+, Tl+ and Cs+, and at least one of Ba++, Sr++ and Ca++. At least one of the aligned sections in the series should be of an optical material of said formula wherein the cations have been partially replaced by at least one of Ba++, Sr++ and Ca++. For practical reasons, when using material of said formula wherein the cations have been partially replaced and x is about 0.80 or more, the monovalent replacement cations should include Cs+, Tl+ or both Cs+ and Tl+. The sections are preferably aligned on the z surface of the crystal.

The process may be used to generate beams having a certain wavelength from two incidental beams. Alternatively, the process may be used to generate two beams from one incident beam. A preferred use of the wavelength conversion process, however, is for second harmonic generation, wherein the generated waves have a wavelength which is one-half the wavelength of the incident beams.

The optical articles of this invention for use in a wavelength conversion system comprise at least one optical conversion segment consisting of a single crystal containing a series of aligned sections of optical materials for wavelength conversion. The sections are preferably aligned on the z surface of the crystal. The series may be represented as a plurality of p aligned adjacent sections of optical materials, $m_1, m_2, \ldots m_i, \ldots m_p$, each having a composition within the formula $K_{1-x}Rb_xTiOMO_4$ and composition where the cations of said formula have been replaced as defined above. Each section is characterized by a length $h_i$ in the direction of alignment and a refractive index $n_i(\omega)$ which varies as a function of frequency $\omega$ of the optical waves passing therethrough. The difference between the total propagation constant of the incident waves for each aligned section and the total propagation constants for the waves generated for each of the aligned sections defines a $\Delta k_i$ for the section. In accordance with this invention, the sections for each of said segments are selected so that the sum of the product of $\Delta k$ for a section and the length h for said section over the segment (i.e., $\Delta k_1 h_1 + \Delta k_2 h_2 + \ldots \Delta k_i h_i + \ldots \Delta k_p h_p$) is equal to about $2\pi N$ where N is an integer other than 0; and the nonlinear optical coefficient of at least one section is changed relative to the nonlinear optical coefficient of at least one adjacent section.

The relationship of the product of the length of each section and the $\Delta k$ for each section in accordance with this invention is identical to conventional refractive index grating phase matching. However, in accordance with this invention, the length of each section can in general be any length, other than zero, consistent with the condition that the sum of the product of the length of each section, $h_i$, and the $\Delta k_i$ for that section is equal to about $2N\pi$ over the length of the optical conversion segment, i.e., for an optical conversion segment containing p sections (i.e., i is from 1 to p), $$\sum_i \Delta k_i h_i \approx 2N\pi.$$

It is desirable that the $$\sum_i \Delta k_i h_i$$

be as close to $2\pi N$ as practical. It should be understood, however, that perfect balance of the optical characteristics and section lengths is difficult to achieve; and that the advantages of this invention can be achieved so long as $$\sum_i \Delta k_i h_i$$

is maintained in the range of about $2\pi N$: that is between $2\pi N + \delta$ and $2\pi N - \delta$ where $\delta$ is less than $2\pi/M$ where M is the total number of optical conversion segments over the entire wavelength conversion path. An approach to designing wavelength conversion paths to achieve this balance is to actually calculate the $\Delta k$ and section length for each section. In this approach, an advantageous balance is considered to occur when the sum over the entire wavelength conversion path of the products of the $\Delta k$ of each section with the length for that section is about $2\pi N$. Preferably the resulting total of said product is between $2\pi N + 1.5\pi/M$ and $2\pi N - 1.5\pi/M$, and most preferably is between $2\pi N + \pi/M$ and $2\pi N - \pi/M$.

As a practical matter, in many cases because of limitations on the precision associated with preparing a series of sections for use in this invention (including preparing the optical materials themselves) one may wish to confirm that the desired balance or the $\Delta k$'s and section lengths have been achieved by observing that the overall coherence length over the entire wavelength conversion path is greater than the length of said path. In some cases, one can observe the overall coherence length directly from examination of the weak scattering of waves along the length of the wavelength conversion path.

For example, in a section wherein two beams of incident optical waves having respective frequencies $\omega_1$ and $\omega_2$ and respective wavelengths $\lambda_1$ and $\lambda_2$ are directed through a medium (e.g., a crystal or a composite material) having a length $h_i$ and having a refractive index $n_i(\omega)$ which varies as a function of the optical wave frequency, to generate optical waves having a frequency $\omega_3$ and a wavelength a beam propagation constant k is defined for each wave beam 5 as equal to $2\pi n(\omega)/\lambda$, and a $\Delta k_i$ for the section is represented by the relationship:

$$\Delta k_i = \frac{2\pi n_i(\omega_3)}{\lambda_3} - \frac{2\pi n_i(\omega_1)}{\lambda_1} - \frac{2\pi n_i(\omega_2)}{\lambda_2}.$$

In accordance with the process of this invention, the incident optical waves of such wavelength conversion systems (having frequencies $\omega_1$ and $\omega_2$) are directed through a series of sections selected such that the sum of $h_i \Delta k_i$ for the series is equal to about $2\pi N$ where N is an integer other than zero. The optical conversion segments for optical articles using such wavelength conversion systems consisting of a series of sections selected such that the sum of $h_i \Delta k_i$ for the series is about $2\pi N$.

In the case of second harmonic generation, $\omega_1$ and $\omega_2$ are equal and are each one-half of $\omega_3$. Accordingly, for second harmonic generation, the $\Delta k_i$ for each section may be represented by the relationship:

$$\Delta k_i = \frac{2\pi}{\lambda_3} (n(\omega_3) - n(\omega_1)).$$

Alternatively, in a section where a beam of incident optical waves having a frequency and wavelength $\lambda_4$ is directed through a medium having a length $h_i$ and having a refractive index $n_i(\omega)$ which varies as a function of the optical wave frequency, to generate two beams of optical waves having respective frequencies $\omega_5$ and $\omega_6$ and respective wavelengths $\lambda_5$ and $\lambda_6$, a beam propagation constant $k_i$ is defined for each wave beam as equal to $2\pi n_i(\omega)/\lambda$, and a $\Delta k_i$ for that section is represented by the relationship:

$$\Delta k_i = \frac{2\pi n_i(\omega_6)}{\lambda_6} - \frac{2\pi n_i(\omega_5)}{\lambda_5} - \frac{2\pi n_i(\omega_4)}{\lambda_4}.$$

In accordance with the process of this invention, the incident optical waves of such wavelength conversion systems (having frequency $\omega_4$) are directed through a series of sections such that the sum of $h_i \Delta k_i$ for the series is equal to about $2\pi N$ where N is an integer other than zero. The optical conversion segments for optical articles using such wavelength conversion systems consist of a series of sections selected such that the sum of $h_i \Delta k_i$ for the series is about $2\pi N$.

In any case, the nonlinear optical coefficient of at least one section in the series must be changed relative to the nonlinear optical coefficient of an adjacent section.

For certain embodiments of this invention the p sections of optical materials may be characterized as q pairs of adjacent sections of optical materials, $m_1$ and $m_2$, $m_3$ and $m_4$, ... $m_{i-1}$ and $m_i$, ... $m_{2q-1}$ and $m_{2q}$ (i.e., p=2q) each section being characterized by corresponding lengths, $h_1, h_2, \ldots h_i, \ldots h_{2q}$, corresponding refractive indices, $n_1, n_2, \ldots n_i, \ldots n_{2q}$, corresponding propagation constants associated with each wavelength of the wavelength conversion system, $k_1, k_2, \ldots k_i, \ldots k_p$, and the materials are selected so that for each pair of sections of material $m_{i-1}$ and $m_i$ the axis of polarization is reversed.

For maximum second harmonic generation, N should be equal to 1, the number of sections per segment should be equal to 2, and the length of each section should be equal to one half its respective coherence length (i.e., $h_i = \pi/\Delta k_1$ and $h_2 = \pi/\Delta k_2$). In general the lengths, $h_i$, can each be different and are each in the range of 0.25 μm to 50 μm. In practice the ratio of adjacent section length, (i.e., $h_{i-1}:h_i$) is usually in the range of 1:20 to 20:1. The width of each section can range from 0.2 μm to 50 μm and is preferably within the range of from 1 μm to 20 μm, and most preferably within the range of from 2 μm to 10 μm. The depth of each section can range from 0.1 μm to 50 μm and is preferably within the range of from 1 μm to 20 μm, and most preferably within the range of from 2 μm to 10 μm. Preferably, there is at least about 1% difference between the nonlinear optical coefficient for at least one section and the nonlinear optical coefficient for at least one adjacent section.

Preferred substrate materials are single crystal materials having the formula $KTiOMO_4$ where M is P or As. Single crystal material of the formula $KTiOMO_4$, which is considered useful as a substrate material in the practice of this invention, can be prepared by any method which provides a crystal of optical quality. Common methods of crystal growth include hydrothermal processes and flux processes. U.S. Pat. No. 4,305,778 discloses a suitable hydrothermal process for growing single crystals of $KTiOMO_4$ which involves using as a mineralizing solution an aqueous solution of a glass defined by specified portions of the ternary diagrams for the selected $K_2O/M_2O_5/(TiO_2)_2$ system. U.S. Pat. No. 4,231,838 discloses a suitable flux growth process for growing single crystals of $KTiOMO_4$ comprising heating selected starting ingredients, chosen to be within the region of a ternary phase diagram in which the desired crystal product is the only stable solid phase, and then controllably cooling to crystallize the desired product. When utilizing single crystals of $KTiOMO_4$ to prepare optical articles in accordance with the teachings of this invention, one can use hydrothermally grown or flux grown crystals. However, it is generally recognized that ion exchange is more difficult in hydrothermally grown crystals; and accordingly molten salt with comparatively higher levels of divalent cation (e.g., $Ba^{++}$) is often more suitable for ion exchange when hydrothermally grown $KTiOMO_4$ crystals are used.

Generally phase matching is of two types: Type I, where the two incident optical waves have the same polarizations; and Type II where the two incident optical waves have orthogonal polarizations. For bulk crystalline $KTiOMO_4$, Type I phase matching gives low conversion efficiencies compared to Type II. Furthermore, in spite of better conversion efficiencies via Type II for bulk crystalline $KTiOPO_4$, phase matching can only be achieved for input wavelengths greater than about 1 μm.

Utilizing an optical article constructed in accordance with this invention allows for a Type I phase matching where the input and output waves are polarized along the polar or c-axis of the crystal and where the nonlinear optical coefficient is about 2 times that of the conventionally used Type II process. Since the second harmonic conversion efficiency is proportional to the square of the nonlinear optical coefficient, the use of the instant invention will provide optical articles that have conversion efficiencies that are about 4 times those for the conventional Type II process. In some Type I embodiments, however, the input polarization is normal to the polar or c-axis and the output polarization is along the polar or c-axis. Furthermore, for the quasi-phase matching provided by the optical article of the instant invention, both Type I and Type II phase matching can be achieved over the entire transparency range in $KTiOPO_4$ (350 nm to 4.5 μm) and in $KTiOAsO_4$ (350 nm to 5.5 μm).

For waveguides, the number of sections provided can depend on such factors as the optical materials used and the waveguide length. A range of about 400 to 1000 sections can be provided in a typical 5.0 mm long waveguide. Longer waveguides can have up to 10,000 sections, or even more. However, articles comprising optical conversion segments of only two sections are also considered to be within the scope of this invention.

The invention may be employed for waveguide structures, and for mixed guided and unguided wave systems. In mixed systems, each unguided length in the wave propagation direction should be less than the defocusing length of the wave in the material to minimize radiation losses between the guide sections.

The instant invention may be used to improve an optical waveguide device comprising at least one channel waveguide, means to couple an incoming optical wave into said channel waveguide and means to couple an optical outgoing optical wave out of said channel waveguide. The device is improved by using an article in accordance with this invention as the waveguide therein.

Employment of the instant invention is illustrated by reference to the apparatus (10) shown in FIG. 1 wherein optical waves emitted by laser (12) at one wavelength may be used to generate waves at another wavelength. Lens (13) is used to focus the optical waves emitted by laser (12) into a waveguide (14) constructed in accordance with this invention. Wavelength conversion occurs within the waveguide (14) and a second lens (17) is provided to collimate the optical waves emerging from the waveguide. A filter (18) is provided in the arrangement shown to filter out the remaining optical waves which have the wavelength of the emitted incident waves, while allowing the optical waves of the desired wavelength which were generated within the waveguide (14) to pass through. Thus, for example, if laser (12) is a $Ti:Al_2O_3$ laser used to generate polarized light at wavelength 0.8 μm, and the waveguide (14) is constructed in accordance with this invention for second harmonic generation using such incident light, the filter (18) would be adapted to allow optical waves of wavelength 0.4 μm to pass through while optical waves of wavelength 0.8 μm are filtered from the collimated beam which emerges from the waveguide. A device incorporating the apparatus of FIG. 1 (i.e., the laser (12), the waveguide (14), the filter (18), and the lenses (13) and (17) is considered to be an article within the scope of this invention. Indeed, waveguides such as waveguide (14) are themselves considered to be articles within the scope of the invention.

One embodiment of a waveguide of the instant invention is shown by the waveguide for second harmonic generation illustrated at (20) in FIG. 2. The waveguide (20) as shown comprises a block (22) of single crystal $KTiOMO_4$ (M is P or As) having sections (24), (25), (26), (27) and (28), all of another crystalline material of the formula $K_{1-x}Rb_xTiOMO_4$ where x is from 0 to 1, wherein the cations of said formula have been partially replaced by at least one of $Rb^+$, $Tl^+$ and $Cs^+$ and at least one of $Ba^{++}$, $Sr^{++}$ and $Ca^{++}$. The sections (24), (25), (26), (27) and (28) are aligned between the top of the article (30) and the bottom of the article (32), such that said sections along with the portions of block (22) aligned therewith comprise a waveguide. The waveguide is designed so that during operation, incident beams of optical waves enter the waveguide at the upper surface (34) of section (24) at the top (30) of the article (20). The incident beams are aligned so that optical waves pass through each of the sections (24), (25), (26), (27) and (28) as well as sections represented by the portions of block (22) in alignment with said sections, and then exit from the bottom (32) of block (22).

Accordingly, as further illustrated by FIG. 3, the waveguide embodied by FIG. 2 is designed so that beams passing therethrough, pass through a number of sections comprised of one material represented by blocks (24), (25), (26), (27) and (28), and an equal number of sections comprised of another material represented by (23), the portions at block (22) in alignment therewith.

A means of preparing a channel waveguide of the type illustrated in FIGS. 2 and 3 in accordance with this invention is to modify the single crystal substrate of the formula $K_{1-x}Rb_xTiOMO_4$, wherein X is from 0 to 1 and M is P or As. Use of these substrates for producing channel waveguides is well known in the art, and reference is made to U.S. Pat. No. 4,766,954 which is hereby incorporated herein in its entirety. A typical substrate for use in producing waveguides is a crystal of $KTiOPO_4$ (i.e., "KTP").

As described in U.S. Pat. No. 4,766,954, the use of substrate masking allows replacement of cations of one optically smooth surface by ions selected from at least one of $Rb^+$ and $Cs^+$ and $Tl^+$ and a resulting change in the surface index of refraction with respect to the index at refraction of the starting substrate. In accordance with the instant invention, the cations are also partially replaced by ions selected from at least one of $Ba^{++}$, $Sr^{++}$ and $Ca^{++}$, and the areas along the portion of the crystal substrate surface used for forming the desired channel may be alternately masked and unmasked during cation replacement so that the resulting channel consists of a series of aligned sections which alternate between original substrate and substrate material in which cations have been replaced by at least one of $Rb^+$, $Tl^+$ and $Cs^+$ and by at least one of $Ba^{++}$, $Sr^{++}$ and $Ca^{++}$ (with the proviso that when x is greater than 0.8, cations have been replaced by at least one of $Tl^+$ and $Cs^+$ and at least one of $Ba^{++}$, $Sr^{++}$ and $Ca^{++}$). Preferably the cations of the substrate are replaced by Ba and at least one of $Tl^+$ and $Rb^+$ to insure change in nonlinear optical coefficient in adjacent sections. Standard photolithographic techniques may be used to provide the desired masking. For example, a mask of protective material (e.g., Ti) may be applied over the z-surface of the crystal substrate with a pattern generated therein to allow, upon suitable exposure to a molten salt, formation of sections of a second optical material by cation exchange. After cation replacement the remaining protective material may be removed.

In the case of this invention the substrate of choice is $KTiOMO_4$, where M is P or As, and preferably P, and the substrate is masked on the z-surface thereof, which can be determined by conventional x-ray crystallographic techniques. Preferably there is sufficient cation replacement to change the nonlinear optical coefficient by at least 1% with respect to the nonlinear optical coefficient of the substrate.

One process for preparing a channel waveguide for a wavelength conversion system in accordance with this invention comprises the steps of: (1) providing the z-surface of a z-cut substrate of single crystal material having the formula $K_{1-x}Rb_xTiOMO_4$ wherein x is from zero to one and M is P or As, with an optically smooth surface; (2) providing a molten salt containing cations selected from the group consisting of $Rb^+$, $Tl^+$ and $Cs^+$ and cations selected from the group consisting of $Ba^{++}$, $Sr^{++}$ and $Ca^{++}$ (with the proviso that when x is greater than 0.8, the molten salt contains cations selected from $Tl^+$ and $Cs^+$), in an amount effective to provide upon exposure to said optically smooth surface at a selected temperature for a selected time, sufficient cation replacement to change the index of refraction with respect to the index of refraction of said substrate and to provide a nonlinear optical coefficient which is changed with respect to the nonlinear optical coefficient of the substrate; (3) applying a masking material on said substrate to provide a pattern of aligned areas along a portion of said optically smooth surface which are alternately masked with a material resistant to said molten salt and unmasked; (4) immersing said masked substrate in said molten salt at said selected temperature for said selected time, thereby providing cation replacement in said unmasked areas; (5) removing the masking material from said substrate; and (6) finishing said substrate to provide a clean waveguide with polished waveguide input and output faces. In this process the length of said masked and unmasked areas is selected such that after said cation replacement in the unmasked areas, a channel waveguide is provided at said portion of the optically smooth surface which comprises at least one optical conversion segment consisting of a series of aligned sections of nonlinear optical materials within a crystal; and such that the sum for the series of section of the product of the length of each section and the $\Delta k$ for that section is equal to about $2\pi N$ where N is an integer other than zero; wherein the $\Delta k$ for each section is the difference between the sum of the propagation constants for the incident waves for the wavelength conversion system in that section and the sum of the propagation constant for the generated waves for said wavelength conversion system in that section. The divalent cations and the monovalent cations can alternatively be exchanged in separate steps.

KTP substrates may be provided in accordance with step (1) by cutting the substrate into z plates and polishing a 1 mm thick z-cut substrate. Preferably the molten salt provided in step (2) contains $Ba^{++}$ together with $Tl^+$, $Rb^+$ or both $Tl^+$ and $Rb^+$. A masking of Ti may be provided in accordance with step (3) in conformance with standard photolithographic techniques by sequentially applying Ti on the substrate; applying a photoresist material over the Ti and curing the photoresist; providing a photomask having the desired pattern and contact exposing the photoresist through the photomask; removing the exposed portion of the photoresist; and etching away the Ti beneath the removed photoresist; and removing the unexposed photoresist, so that the patterned Ti masking remains. Typically, the substrate will be end polished before it is immersed in the molten salt; and washed after removal of the salt. After the Ti mask is removed, the waveguide may be suitably mounted so that a laser beam may be directed therein. Preferably the cation exchange provides a change in the surface index at refraction so that there is at least about 0.00025 difference between the surface index of refraction of at least one section (e.g., the cation exchanged sections) and the surface index of refraction of at least one adjacent section (e.g., the substrate).

It should be recognized that the Δk for each section in which cations have been exchanged in accordance with this process for waveguide preparation can be varied somewhat by changing the section width and/or depth, and may also vary somewhat as a function of replacement ion type and concentration. Accordingly, one may wish to prepare a number of waveguides having various widths, etc. to determine optimum design for a particular wavelength conversion system using particular materials.

To further illustrate the processing latitude afforded by this invention and the relationship between waveguide depth and refractive index mismatch, Δn, one skilled in the art can calculate the refractive index mismatch, i.e., Δn, for Type I second harmonic generation in KTiOPO$_4$ (KTP) with y-propagation (i.e., $\Delta n = n_z(\omega) - n_z(2\omega)$ where $n_z(\omega)$ and $n_z(2\omega)$ are respectively the effective refractive indexes of the incident and generated optical wave of frequency and $\omega$ and $2\omega$ for z polarization) as a function of guide depth for a waveguide of various waveguide widths using the methods described in M. J. Adams, "An Introduction to Optical Waveguides", (John Wiley & Sons, N.Y. 1981). Using this approach the effective mode indices for the lowest order spatial modes at $\lambda = 0.420$ and $0.840$ μm were calculated. In the calculation, an exponential index profile in the depth direction was assumed. The refractive indices used for KTP are $n_z = 1.8410$ at $\lambda = 0.840$ μm and $n_z = 1.946$ at $\lambda = 0.420$ μm, as disclosed in J. D. Bierlein and H. Vanherzeele, J. Opt. Soc. Am., B, 6, 622-633 (1989). For planar Rb-exchanged waveguides the surface index has been measured to be $n_z = 1.8610$ at $\lambda = 0.840$ μm and $n_z = 1.966$ at $0.420$ μm. The result of the calculation is shown in FIG. 5. At zero waveguide depth, the Δn equals the bulk KTP substrate value. The corresponding coherence length is 4 μm. For the Rb-exchanged guides, at infinite depth the Δn would correspond to that for bulk RbTiOPO$_4$ (RTP). A minimum occurs in the 1 to 3 μm depth range.

FIG. 5 illustrates the practical advantage of using waveguides segmented in accordance with the teachings of this invention relative to uniform waveguides for achieving phase matching for second harmonic generation. Since a minimum occurs in the Δn vs. depth curve, near this minimum very little change in Δn is expected with changes in processing conditions, such as exchange time or temperature, which change guide depth. Selecting this minimum, phase matching is achieved by adjusting the length of each section of the optical conversion segment such that $h_1 \Delta n_1 + h_2 \Delta n_2$ is about equal to $N2\pi$. In contrast, for other waveguide depths, a small processing change affecting waveguide depth will give a larger change in Δn and, hence, processing latitude will be narrower.

Utilization of the z-surface of the single crystal substrate of choice, specifically KTiOPO$_4$, and cation replacement using Ba$^{++}$ together with Tl$^+$, Rb$^+$ or both Tl$^+$ and Rb$^+$ are preferable in the practice of this invention to enhance the achievement of a change in nonlinear optical coefficient of adjacent sections. Prior to masking and cation exchange thereon, the z-surface of the single crystal substrate can be determined by conventional x-ray crystallographic techniques, as stated above. Where the change in nonlinear optical coefficient is attributable to reversed polarization, observation of reversed polarization can be made by etching the optical article, or more particularly, the optical conversion segment or segments thereof, or by surface SHG (second harmonic generation) technologies. For example, liquid electrostatic toner may be used to preferentially tone either the cation exchanged section of the optical conversion segment or the unexchanged section.

A further embodiment of an optical article in accordance with the instant invention in the form of a waveguide is illustrated in FIG. 4. A single crystal of KTiOPO$_4$ (22) has a plurality of aligned sections (29), (31), (33), (35) and (37) of the formula $K_{1-x}Rb_xTiOPO_4$, wherein x is less than and greater than 0, alternating with a plurality of aligned sections (30), (32), (34), (36) and (38) of the formula $K_{1-x}Rb_xTiOPO_4$, wherein x is less than 1 and greater than or equal to 0 and wherein the cations are partially substituted with Tl$^+$ and partially substituted with Ba$^{++}$. In this embodiment the cation substitution in the KTiOPO$_4$ substrate in the manner shown insures substantially complete guidance of the wave on the optical path through the waveguide.

Practice of the invention will become further apparent from the following non-limiting Examples.

EXAMPLES

To determine polarization reversal in the waveguides prepared in the Examples which follow, each waveguide was secured to the bottom of a petri dish using a commercially available grease (Apiezon N grease). The dish was then dipped into a dry ice-acetone bath for about 4 seconds, and a few drops of high resolution electrostatic toner was applied to the waveguide. The toners used are electrically charged micron sized particles suspended in isopar. A suitable positively charged commercially available toner is James River Graphics T8718. A suitable negatively charged commercially available toner is Savin black toner, commonly used in the Savin 7300 copier. In either case the solids content of the toner was adjusted to approximately 0.1 to 1% by weight, based on the total weight of solids and isopar.

EXAMPLE 1

A hydrothermally grown crystal of KTiOPO$_4$ was first cut into approximately 1 mm thick z-plates. Then the z-surface was polished and coated with about 1000 Å of Ti by thermal evaporation. A photoresist was then contact exposed through a photomask containing the desired waveguide patterns. The exposed photoresist was removed and the Ti coating revealed beneath the removed photoresist was chemically etched using a solution of ethylene diamine tetraacetic acid (EDTA), H$_2$O$_2$ and NH$_4$OH so that the KTiOPO$_4$ substrate was selectively revealed. The remaining photoresist was then removed and the Ti-masked substrates were end polished.

A series of waveguide patterns were generated in the Ti mask for the purposes of allowing preparation of Rb/Tl/Ba-exchanged waveguide sections alternatively with section of bulk KTiOPO$_4$. The masked substrates provided 36 different waveguide patterns having on the order of about 400 to 1000 sections. These patterns consisted of open areas with widths that vary in 1 μm steps from 4 to 9 μm and, in the beam propagation direction, again in 1 μm step lengths ranging from 3 to 6 μm. The waveguides were oriented for x propagation in the KTiOPO$_4$.

The masked substrates were polished to give a total guide length of approximately 5 mm and ion exchanged in a molten salt bath consisting of 1 mole % BaNO$_3$, 95 mole % RbNO$_3$, and 4 mole % TlNO$_3$, at a temperature of 360° C. for an exchange time of 1 hour. After the exchange time had elapsed, the substrate was cooled to room temperature and the Ti mask was removed.

The second harmonic generation conversion efficiency was measured using endfire coupling of a dye laser through a microscope objective. The wavelength of this laser was varied from about 850 nm to 970 nm and the second harmonic output observed. Type I phase matched second harmonic generation output (i.e., phase matching wherein the two incident waves have the same polarization) at 0.407 μm was observed for a guide period of 4 μm and a guide width of 5 μm and for a guide period of 5 μm the phase matched output was at 0.43 μm. In both cases a second harmonic conversion efficiency of about 0.02%/W-cm$^2$ was observed.

EXAMPLE 2

The procedure of Example 1 was followed except that the crystal of KTiOPO$_4$ was flux grown and a Ti:Al$_2$O$_3$ laser was used to measure the second harmonic generation conversion efficiencies.

Type I phase matched second harmonic generation output (i.e., phase matching wherein the two incident waves have the same polarization) at 0.43 μm was observed for a guide period of 4 μm and a guide width of 5 μm having a second harmonic conversion efficiency of about 50%/W-cm$^2$. For a guide period of 5 μm the phase matched output was at 0.45 μm and for a guide of 6 μm the phase matched output was at 0.48 μm, both with a second harmonic conversion efficiency of about 50%/W-cm$^2$.

EXAMPLE 3

A flux grown crystal of KTiOPO$_4$ was cut, polished, masked, processed and evaluated using a procedure generally in accordance with the procedure of Example 2, except that the exchange time was 45 minutes. Type I phase matched second harmonic generation of 0.85 μm input was observed for a guide width of 5 μm and a guide period of 4 μm with a second harmonic conversion efficiency of about 50%/W-cm$^2$.

EXAMPLE 4

A flux grown crystal was cut, polished, masked, processed and evaluated in accordance with Example 2, except that this sample was ion-exchanged in a molten salt bath comprised of 1 mole % Ba(NO$_3$)$_2$, 99 mole % RbNO$_3$ for 30 minutes at 360° C. After the treatment, the substrate was cooled to room temperature and the Ti mask was removed. With the Ti:Al$_2$O$_3$ laser, Type I phase matching was observed for a guide period of 3 μm and a guide width of 5 μm. Conversion was from $\lambda = 0.79$ μm to 0.395 μm and the second harmonic conversion efficiency was about 40%/W-cm$^2$. For a guide period of 4 μm and a guide width of 5 μm, the second harmonic conversion was from $\lambda = 0.85$ μm to $\lambda = 0.425$ μm, with an efficiency of about 20%/W-cm$^2$.

EXAMPLE 5

The procedure of Example 1 was followed except that a molten salt bath consisting of 5 mole % BaNO$_3$ and 95 mole % RbNO$_3$ was utilized; the waveguides were oriented for y propagation in the KTiOPO$_4$; and a diode laser at a wavelength of 850 nm was used to measure the second harmonic conversion efficiency.

Type I phase matched second harmonic generation output at 0.425 μm was observed for a guide width of 6 μm and a guide period of 4 μm with a second harmonic conversion efficiency of about 3%/W-cm$^2$.

Figure 6:
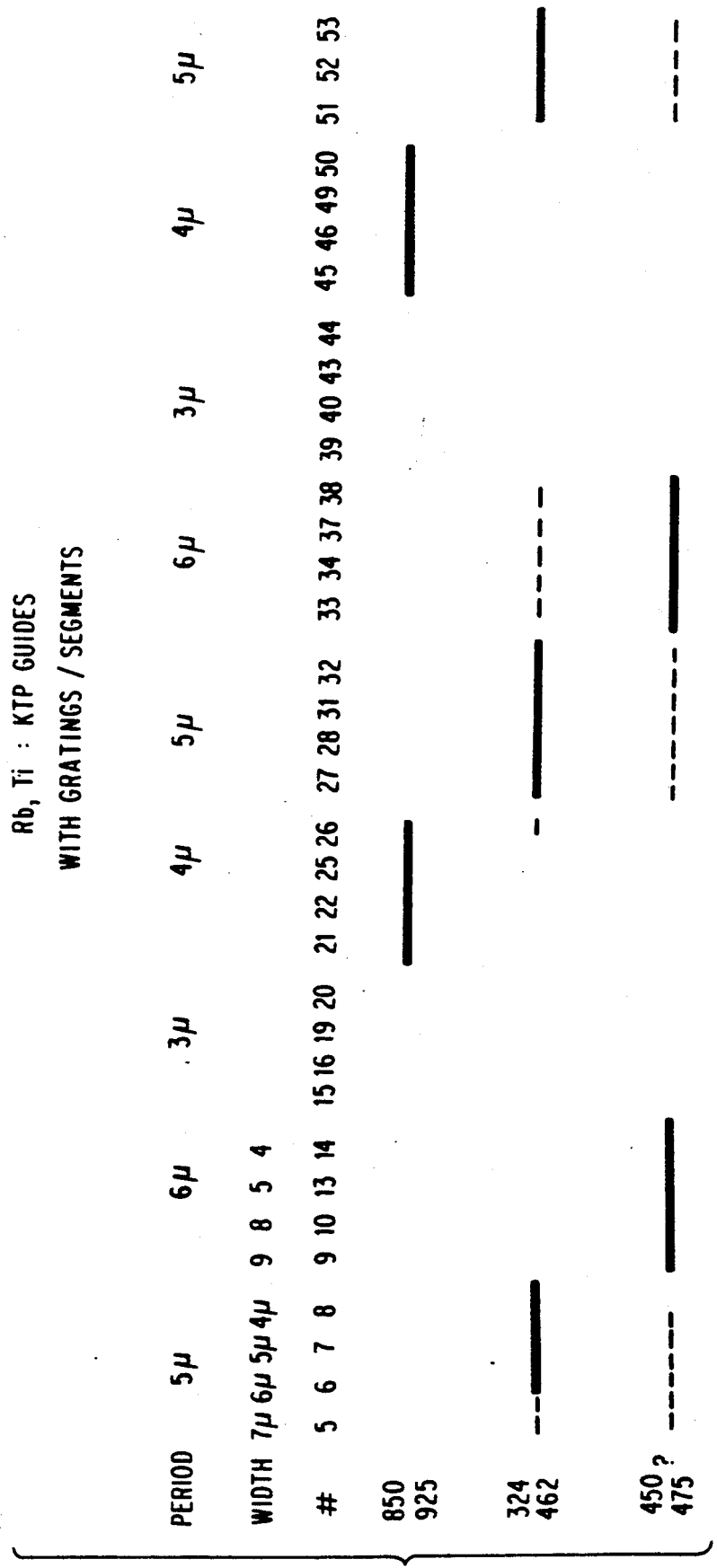
FIG. 6 illustrates the correlation of second harmonic wavelength with the period of the waveguide.

FIG. 6 illustrates the correlation between the wavelength of the light that is to be converted and the period of the Rb, Ti doped KTP waveguide. The tested waveguide was supplied with channels of varying periods and widths. The top row represents the period in microns (4) of the gratings/segments. The left hand column shows the wavelength in nanometers (nm) of the input (top figure) and the output (bottom figure) light. The second row indicates the width of the channels tested. The row label # indicates the sequential number of the channel tested. In the graph the solid lines indicate strong second harmonic generation and the dotted lines indicate weak second harmonic generation. As can be seen the 4 μ period channels were effective to generate 425 nm light from 850 nm input light. The 5 μ period channels were effective at generating 462 nm light from 924 nm input light and the 6 μ period channels generated 475 nm output light, from 950 nm input light.

The results show that efficient second harmonic generation occurs in Rb, Tl KTP waveguides which are periodically modulated to obtain phase matching. The efficiency of the guides may be further increased by a variety of techniques including optimization of the index step, geometry profile, and orientation of the unit cells making up the waveguide structure. Other factors in this consideration include mode beating in multimode configurations and Fabry-Perot like resonances in the unit cells.

Particular embodiments of the invention are included in the examples. Other embodiments will become apparent to those skilled in the art from a consideration of the specification or practice of the invention disclosed herein. It is understood that modifications and variations may be practical without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A process for wavelength conversion comprising the step of directing the incident optical waves for wavelength conversion through a single crystal containing a series of aligned sections of optical materials for wavelength conversion selected from (a) materials having the formula $K_{1-x}Rb_xTiOMO_4$ where x is from 0 to 1 and M is selected from P and As and (b) materials of said formula wherein the cations of said formula have been partially replaced by at least one of Rb$^+$, Tl$^+$ and Cs$^+$, and at least one of Ba$^{++}$, Sr$^{++}$ and Ca$^{++}$, with the provisos that at least one section is of optical materials selected from (b) and that for optical materials selected from (b) wherein x is greater than 0.8, the cations of said formula are partially replaced by at least one of Tl$^+$ and Cs$^+$ and at least one of Ba$^{++}$, Sr$^{++}$ and Ca$^{++}$, said sections being selected such that the sum for the series of sections of the product of the length of each section in the direction of alignment and the Δk for that section is equal to about 2πN where N is an integer other than zero, and such that the nonlinear optical coefficient of at least one section is changed relative to the nonlinear optical coefficient of at least one adjacent section; wherein the Δk for each section is the difference between the sum of the propagation constants for the incident waves for the wavelength conversion system in that section and the sum of the propagation constants for the generated waves for the wavelength conversion system in that section.

2. A process for wavelength conversion in accordance with claim 1, wherein incident waves of frequencies $\omega_1$ and $\omega_2$ are used to generate waves of frequency $\omega_3$; and wherein $\omega_3$ is equal to the sum of $\omega_1$ and $\omega_2$.

3. A process for wavelength conversion in accordance with claim 1, wherein incident waves of frequency $\omega_4$ are used to generate waves of frequencies $\omega_5$ and $\omega_6$ and wherein $\omega_4$ is equal to the sum of $\omega_5$ and $\omega_6$.

4. A process for wavelength conversion in accordance with claim 1, wherein second harmonic waves of the incident optical waves are generated.

5. A process for wavelength conversion in accordance with claim 1, wherein the length of each section is in the range of 0.25 $\mu$m to 50 $\mu$m; wherein the width of each section is in the range of 0.2 $\mu$m to 50 $\mu$m; and wherein the depth of each section wherein said cations have been partially replaced is in the range of 0.1 $\mu$m to 50 $\mu$m.

6. A process for wavelength conversion in accordance with claim 5, wherein said single crystal is a modified $KTiOPO_4$ single crystal and wherein said directing step comprises directing the incident optical waves for wavelength conversion through said modified $KTiOPO_4$ single crystal so as to produce blue light.

7. A process for wavelength conversion in accordance with claim 1, wherein said single crystal is a modified $KTiOPO_4$ single crystal and wherein said directing step comprises directing the incident optical waves for wavelength conversion through said modified $KTiOPO_4$ single crystal so as to produce blue light.

8. An optical article for use in a wavelength conversion system, said optical article comprising at least one optical conversion segment consisting of a single crystal containing a series of aligned sections of optical materials selected from (a) materials having the formula $K_{1-x}Rb_xTiOMO_4$ where x is from 0 to 1 and M is selected from P and As and (b) materials of said formula wherein the cations of said formula have been partially replaced by at least one of $Rb^+$, $Tl^+$ and $Cs^+$, and at least one of $Ba^{++}$, $Sr^{++}$ and $Ca^{++}$, with the provisos that at least one section is of optical materials selected from (b) and that for optical materials selected from (b) wherein x is greater than 0.8, the cations of said formula are partially replaced by at least one of $Tl^+$ and $CS^+$ and at least one of $Ba^{++}$, $Sr^{++}$ and $Ca^{++}$, wherein said sections are selected so that the sum of the product of the length of each section in the direction of alignment and the $\Delta k$ for that section is equal to about $2\pi N$ where N is an integer other than zero, and so that the nonlinear optical coefficient of at least one section is changed relative to the nonlinear optical coefficient of at least one adjacent section; wherein the $\Delta k$ for each section is the difference between the sum of the propagation constants for the incident waves for the wavelength conversion system in that section and the sum of the propagation constants for the generated waves for the wavelength conversion system in that section.

9. An optical article in accordance with claim 8, having alternating sections of a first $KTiOPO_4$ material, and a second $KTiOPO_4$ material wherein cations in said second $KTiOPO_4$ material have been partially replaced by $Ba^{++}$, and at least one of $Tl^+$ and $Rb^+$.

10. An optical article in accordance with claim 9, which is a waveguide comprising alternating sections of a crystalline substrate having the formula $K_{1-x}Rb_xTiOMO_4$ wherein x is from zero to one and M is P or As, and sections of substrate material in which the cations of said substrate have been replaced by sufficient cations selected from the group consisting of $Rb^+$, $Cs^+$ and $Tl^+$ and sufficient cations selected from the group consisting of $Ba^{++}$, $Sr^{++}$ and $Ca^{++}$ to change the nonlinear optical coefficient by at least 1% with respect to the nonlinear optical coefficient of said substrate.

11. An optical article in accordance with claim 8, wherein the length of each section is in the range of 0.25 $\mu$m to 50 $\mu$m, wherein the width of each section is in the range of about 0.2 $\mu$m to 50 $\mu$m, and wherein the depth of each section wherein said cations have been partially replaced is within the range of about 0.1 $\mu$m to 50 $\mu$m.

12. An optical article in accordance with claim 8, wherein there is at least about 1% difference between the nonlinear optical coefficient for at least one section and the nonlinear optical coefficient for at least one adjacent section; and wherein there is at least about 0.00025 difference between the surface index of refraction of said at least one section and the surface index of refraction of said at least one adjacent section.

13. In an optical waveguide device comprising at least one channel waveguide, means to couple an incoming optical wave into said channel waveguide and means to couple an outgoing wave out of said channel waveguide, the improvement wherein the channel waveguide is an optical article as provided in claim 8.

14. A process for preparing a channel waveguide for a wavelength conversion system comprising the steps of:

(1) providing the z-cut surface of a z-cut substrate of single crystal material having the formula $K_{1-x}Rb_xTiOMO_4$ wherein x is from zero to one and M is P or As with an optically smooth surface;

(2) providing a molten salt containing cations selected from the group consisting of $Rb^+$, $Cs^+$ and $Tl^+$ and cations selected from the group consisting of $Ba^{++}$, $Sr^{++}$ and $Ca^{++}$ with the proviso that when x is greater than 0.8, the molten salt contains cations selected from $Tl^+$ and $Cs^+$, in an amount effective to provide upon exposure to said optically smooth surface at a selected temperature for a selected time, sufficient cation replacement to change the index of refraction with respect to the index of refraction of said substrate and to provide a nonlinear optical coefficient which is changed with respect to the nonlinear optical coefficient of the substrate;

(3) applying a masking material on said substrate to provide a pattern of aligned areas along a portion of said optically smooth surface which are alternately masked with a material resistant to said molten salt and unmasked;

(4) immersing said masked substrate in said molten salt at said selected temperature for said selected time, thereby providing cation replacement in said unmasked areas; and (5) removing the masking material from said substrate; wherein the length of said masked and unmasked areas being selected such that after said cation replacement in the unmasked areas, a channel waveguide is provided at said portion of the optically smooth surface which comprises at least one optical conversion segment consisting of a series of aligned sections of nonlinear optical materials within a crystal; and such that the sum for the series of sections of the product of the length of each section and the $\Delta k$ for that section is equal to about $2\pi N$ where N is an integer other than zero; wherein the $\Delta k$ for each section is the difference between the sum of the propagation constants for incident waves for the wavelength conversion system in that section and the sum of the propagation constants for generated waves for said wavelength conversion system in that section.

15. A method for producing a channel waveguide for a wavelength conversion system, the channel waveguide having at least one optically smooth surface which comprises at least one optical conversion segment consisting of a series of aligned sections of nonlinear optical materials within a crystal such that the sum for the series of sections of the product of the length of each section in the direction of optical propagation and the $\Delta k$ for that section is equal to about $2\pi N$, where N is an integer other than zero, wherein the $\Delta k$ for each section is the difference between the sum of the propagation constants for incident waves for the wavelength conversion system in that section and the sum of the propagation constants for the generated waves for said wavelength conversion system in that section, said method comprising the steps of:

providing the z-cut surface of a z-cut substrate of single crystal material, said material having the formula $K_{1-x}Rb_xTiOMO_4$ wherein x is from zero to one and M is P or As, with an optically smooth surface, said optically smooth surface having a masking material applied so as to provide a pattern of aligned areas along a portion of said optically smooth surface which are alternately masked with a material resistant to a molten salt and unmasked so as to provide at least one masked area and at least one unmasked area;

immersing said substrate in said molten salt at a selected temperature for a selected time so as to promote cation replacement in said at least one unmasked area;

wherein said molten salt contains cations selected from the group consisting of $Rb^+$, $Cs^+$ and $Tl^+$ and cations selected from the group consisting of $Ba^{++}$, $Sr^{++}$ and $Ca^{++}$ with the proviso that when x is greater than 0.8, the molten salt contains cations selected from $Tl^+$ and $Cs^+$, in an amount effective to provide, upon exposure to said optically smooth surface at said selected temperature for said selected time, sufficient cation replacement to change the index of refraction of said at least one unmasked area with respect to the index of refraction of said substrate and to provide a nonlinear optical coefficient in said at least one unmasked area which is changed with respect to the nonlinear optical coefficient of the substrate.

16. A method for efficiently generating blue light comprising the step of applying light having wavelengths in the range of 775–950 nm to a periodically segmented non-linear optical KTP waveguide structure having a periodicity of 3–6 $\mu$, wherein the KTP waveguide is doped with at least one of $Rb^+$ and $Tl^+$ and at least one of $Ba^{++}$, $Sr^{++}$ and $Ca^{++}$.

17. The method as claimed in claim 16, wherein said light is TM polarized light.

18. Apparatus for multiplying the frequency of light comprising a non-linear optical KTP waveguide structure having a channel of alternating regions with differing linear and non-linear indexes of refraction with a periodicity of 3–6 $\mu$ in combination with means for injecting light with a wavelength in the range of 775–950 nm into said channel, wherein the KTP waveguide is doped with at least one of $Rb^+$ and $Tl^+$ and at least one of $Ba^{++}$, $Sr^{++}$ and $Ca^{++}$.

19. The apparatus as claimed in claim 18, wherein said means for injecting light comprises means for polarizing said light so that its direction of polarization is perpendicular to the direction of propagation of said non-linear optical KTP waveguide structure.

* * * * *

UNITED STATES PATENT AND TRADEMARK OFFICE
CERTIFICATE OF CORRECTION

PATENT NO. : 5,157,754

DATED : October 20, 1992

INVENTOR(S) : John D. Bierlein, et al

It is certified that error appears in the above-identified patent and that said Letters Patent is hereby corrected as shown below:

Col. 1, line 49, after "are" delete "5";

Col. 2, line 56, change "$w_1$ and w2" to --$w_1$ and $w_2$--

Col. 5, lines 1-4, delete in their entirety and insert therefor --(i.e., $\sum_i \Delta k_i h_i \approx 2\pi N$)--

Col. 5, lines 38-42, delete in their entirety and insert therefor --(i.e., $\sum_i \Delta k_i h_i \approx 2\pi N$)--;

Col. 6, lines 10-14, delete in their entirety and insert therefor --(i.e., $\sum_i \Delta k_i h_i \approx 2\pi N$)--;

lines 35-38, delete in their entirety and insert therefor --$\sum_i \Delta k_i h_i$)--;

Col. 7, line 68, change "$\pi 5$" to --$\lambda 5$--;

Col. 9, lines 16-19, delete in their entirety and insert therefor --$\sum_i \Delta k_i h_i \approx 2N\pi$--;

UNITED STATES PATENT AND TRADEMARK OFFICE
CERTIFICATE OF CORRECTION

PATENT NO. : 5,157,754
DATED : October 20, 1992
INVENTOR(S) : John D. Bierlein, et al It is certified that error appears in the above-identified patent and that said Letters Patent is hereby corrected as shown below:

lines 21-25, delete in their entirety and insert therefor $--\sum_i \Delta k_i h_i --$;

lines 31-34, delete in their entirety and insert therefor $--\sum_i \Delta k_i h_i --$;

line 68, after "wavelength" insert $--\lambda 3,--$;

Col. 10,   line 1,   after "beam" delete "5";

Col. 15,   line 19,   change "$\Delta n = n_z, (w)$" to $--\Delta n = n_z(w)--$;

line 40,   change "$RbTiOPO_4$" to $--RbT_iOPO_4--$.

Signed and Sealed this

Twelfth Day of July, 1994

BRUCE LEHMAN

Attest:

Attesting Officer     Commissioner of Patents and Trademarks